United States Patent [19]

Gunkel et al.

[11] Patent Number: 4,738,356

[45] Date of Patent: Apr. 19, 1988

[54] CONTAINER FOR AGGRESSIVE LIQUIDS

[75] Inventors: Werner Gunkel, Roosdorf; Frank Joseph, Gernsheim, both of Fed. Rep. of Germany

[73] Assignee: Merck Patent Gesellschaft mit beschrankter Haftung, Darmstadt, Fed. Rep. of Germany

[21] Appl. No.: 941,122

[22] Filed: Dec. 12, 1986

[30] Foreign Application Priority Data

Dec. 14, 1985 [DE] Fed. Rep. of Germany ....... 3544260

[51] Int. Cl.[4] ...................... B65D 47/20; B65D 90/04; F16K 27/12

[52] U.S. Cl. ................................ 206/524.3; 137/375; 206/524.5; 220/1 B; 220/461; 251/368

[58] Field of Search .................. 156/244.18; 137/375, 137/376, 454.6, 560, 561; 251/368; 220/203, 204, 209, 1 B, 367, 404, 460, 461; 206/524.2, 524.3, 524.4, 524.5, 524.6

[56] References Cited

U.S. PATENT DOCUMENTS

| | | | |
|---|---|---|---|
| 1,669,022 | 5/1928 | Root, Jr. | 137/375 |
| 1,846,535 | 2/1932 | Waffenschmidt | 137/375 |
| 2,200,903 | 5/1940 | Stephens | 137/375 |
| 2,469,109 | 5/1949 | Goecke | 137/375 |
| 2,910,988 | 11/1959 | Davis | 137/375 |
| 3,623,629 | 11/1971 | Hendershot | 220/461 |
| 3,922,186 | 11/1975 | Segewa et al. | 156/244.18 |
| 4,535,803 | 8/1985 | Price | 137/375 |

FOREIGN PATENT DOCUMENTS

| | | | |
|---|---|---|---|
| 1209827 | 1/1966 | Fed. Rep. of Germany | 137/375 |

*Primary Examiner*—Jimmy G. Foster
*Attorney, Agent, or Firm*—Millen & White

[57] ABSTRACT

A container intended for transporting and discharging aggressive liquids, such as silicon tetrachloride, is closed with a container lid which carries a valve head. The inner surfaces of the container and of the container lid are lined with fluorinated hydrocarbon. The valve head has a valve block which, in valve block drilled holes accommodates valve inserts and is enclosed by a steel jacket which is bolted to the container lid. All the parts which come into contact with the aggressive liquid consist of fluorinated hydrocarbon, so that contact between the aggressive liquid and metal is avoided.

8 Claims, 1 Drawing Sheet

CONTAINER FOR AGGRESSIVE LIQUIDS

BACKGROUND OF THE INVENTION

The invention relates to a container for aggressive, i.e. corrosive, liquids and in particular liquids which are aggressive towards stainless steel, such as silicon tetrachloride. The container has a container opening which is closed by a container lid and which carries a valve head which is comprised at least partially of plastic.

Transport and discharge containers made of stainless steel are used for many aggressive liquids. These containers have the advantage that they are less sensitive to the type of damage which can arise during transport than glass or plastic containers. However, some aggressive liquids, such as silicon tetrachloride, do attack stainless steel and dissolve impurities out of the stainless steel. It is true that there are existing plastics which are not attacked by silicon tetrachloride and similar substances, namely fluorinated hydrocarbons. However, the preparation of container parts, in particular valve heads, from these materials presents difficulties, since the plastics belonging to the group of the fluorinated hydrocarbons undergo cold flow, i.e. under prolonged mechanical pressure become permanently distorted. For that reason a gas- and liquid-tight seal with components made of these plastics has hitherto not been possible.

SUMMARY OF THE INVENTION

The invention has for its object to provide a container of the type mentioned at the beginning, which is suitable for transporting and discharging aggressive liquids, in particular silicon tetrachloride, which guarantees a high transport safety and with which, even in the area of the valve head, the liquid to be accommodated does not come into contact with stainless steel or other materials which are attacked by the liquid.

Upon further study of the specification and appended claims, further objects and advantages of this invention will become apparent to those skilled in the art.

The object is achieved according to the invention when the inner surfaces of the container and of the container lid have a complete lining of fluorinated hydrocarbon and in that, in the valve head, a fluorinated hydrocarbon valve block has been inserted into a steel jacket which is detachably connected to the container lid and accommodates valve inserts which consist at least partially of fluorinated hydrocarbon in valve block drilled holes.

The complete lining of the container and of the container lid with a plastic which is not attacked by the aggressive liquid prevents in this area contact between the aggressive liquid and the container material, which can preferably be stainless steel, so that the favourable strength properties for a relatively low weight are maintained.

Since all the drilled holes and lines to be carried out within the area of the valve head extend within the valve block which consists completely of the plastic which is not attacked by the aggressive liquid, any harmful contact with components made of another material is also completely prevented in the entire valve area. Since the fluorinated hydrocarbon valve block itself has no adequate long-term strength, since the plastic used tends to flow, the valve block obtains its strength required for the sealing function from the steel jacket which encloses the valve block and which preferably likewise consists of stainless steel. The flow tendency of the valve block material is stopped by virtue of the fact that the valve block has been enclosed on all sides and thus cannot change its shape even under prolonged mechanical pressure, even when, to obtain an adequate sealing action, the valve block is pressed with considerable force against the container lid.

This is preferably effected by virtue of the fact that the steel jacket containing the valve block has a flange which is arranged at a distance from the container lid and which is connected to the container lid by means of flange bolts.

In a further development of the inventive idea it is provided that the valve block drilled holes which each accommodate one valve insert each have a valve seat against which a valve seal body of the valve insert bears. This dispenses with the need to provide a special valve seat which would have to be retained and sealed off in the valve block.

In a preferred embodiment of the invention, the valve block is of cylindrical shape and has been fittingly inserted into the cylindrical inner space of the steel jacket, and a front surface of the valve block bears sealingly against the upper side of the container lid. This shape of the valve block is not only advantageous from a manufacturing viewpoint; another consequence of the shape is that the valve block undergoes virtually no change in shape as a result of the force applied in pressing against the container lid. Any small change in shape which occurs in the area of the front surface resting against the container lid has no effect on the function of the valve inserts and in particular on the sealing function thereof, since the valve inserts have been arranged at a distance from this front surface.

A material which is particularly preferred according to the invention for lining the container and the container lid and also for the valve block is polyvinylidene fluoride, which is completely inert towards silicon tetrachloride.

Further advantageous developments of the inventive idea are the subject-matter of further subclaims.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DESCRIPTION OF THE PREFERRED EMBODIMENT

Figure 1:
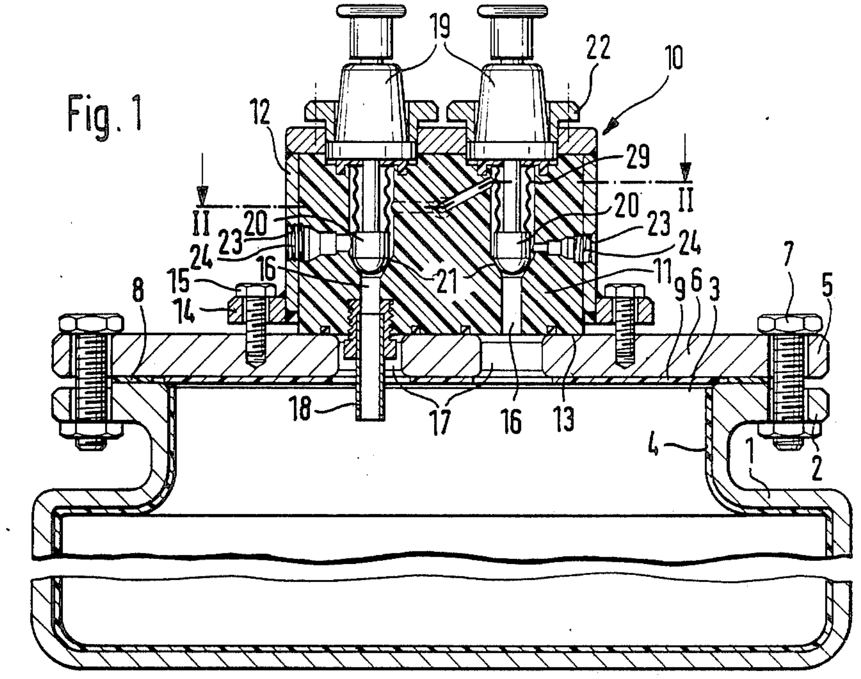
FIG. 1 shows a transport and discharge container for silicon tetrachloride with emplaced valve head in a vertical section.

The container 1 which is depicted only in part in FIG. 1 has a container opening 3 which has a flange 2 and the diameter of which has been chosen to be sufficiently large, for example 300 mm, that the inner surface of the stainless steel container 1 can be provided with a complete lining 4 of fluorinated hydrocarbon.

A container lid 6, which likewise has a flange 5, is tightly connected to the container 1 via a flange bolting 7 with an interlayered seal 8 of fluorinated hydrocarbon. The container lid 6 likewise has on its inner surface a complete lining 9 of fluorinated hydrocarbon.

Emplaced upon the container lid 6 is a valve head 10 which has in its interior an essentially cylindrical valve block 11 made of fluorinated hydrocarbon. The valve block 11 is enclosed at its circumference and its upper surface by a stainless steel jacket 12 into which the valve block 11 has been fittingly inserted.

The lower front surface 13 of the valve block 11 is sealingly pressed against the upper surface of the container lid 6. To this end, a flange 14 has been welded to the steel jacket 12 at a distance from the upper surface of the container lid 6 and is tightened with flange bolts 15 against the container lid 6.

The valve block 11 has been provided with two vertical valve block drilled holes 16 which are in line with two openings 17 in the container lid 6. A dip tube 18 which dips into the liquid accommodated in the container 1 has been screwed upwardly into a valve block drilled hole 16.

Valve inserts 19 project downward into the two spaced-apart vertical valve block holes 16. A movable valve seal body 20 of each valve insert 19 bears sealingly against a valve seat 21 formed by a conical shoulder in each vertical valve block drilled hole and, in the closed state, seals off tight the section of valve block drilled hole 16 which in each case is present thereunder.

A clamping bushing 22 which is bolted from above against the lid of the steel jacket 12 forces each of the two valve inserts 19 sealingly against the valve block 11. Above the two valve seats 21, horizontal feed and discharge drilled holes 23 end in the valve block drilled hole 16. A connecting thread 24 in the drilled hole 23 has been cut not only into the steel jacket 12 but also into the valve block 11, so that a screwed-in (not depicted) connecting part can be sealingly connected to the drilled hole 23.

Figure 2:
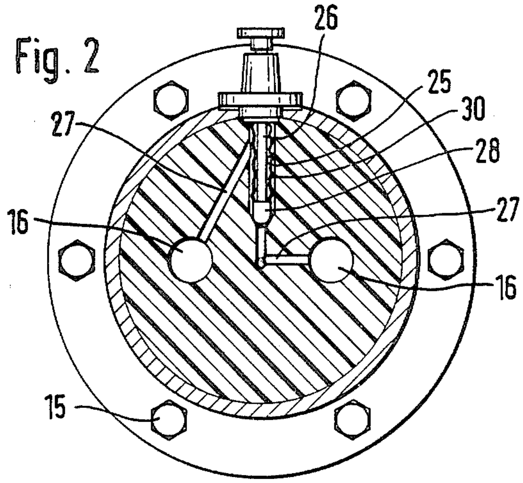
FIG. 2 shows a section along the line II—II in FIG. 1 through the valve head, from which, for simplicity, the vertical valve inserts have been omitted.

A horizontal valve block drilled hole 25 accommodates a flush valve insert 26 in the same way as the valve inserts 19. Purging drilled holes 27 connect the horizontal valve block drilled hole 25 with the two vertical valve block drilled holes 16 (FIG. 2). On opening the valve insert 26 the feed and discharge drilled holes 23 are in connection with each other via the purging drilled holes 27 and the horizontal valve block drilled hole 25 and can be purged with a protective gas. All valve inserts 19 and 26 are protected from the aggressive liquid by a set of bellows 29 or 30 arranged between the valve seal body 20 or 28 and the valve insert 29 or 26 and consisting for example of polytetrafluorethylene. The valve seal bodies 20 and 28 are made of polytetrafluorethylene or polyvinylidene fluoride.

All parts which can come into contact with the aggressive liquid to be accommodated, for example silicon tetrachloride, consist of plastics or are lined with plastics which are impervious to these liquids, namely fluorinated hydrocarbons, such as polyvinylidene fluoride. This applies in particular also to the area of the valve head 10, since there the entire valve block 11 consists of this plastic. However, the plastic, which has a tendency to undergo cold flow, cannot undergo any or only extremely small changes in shape even under the action of the contact force directed against the container lid 6, since the plastic is completely enclosed between the steel jacket 12 and are forced downward against the valve block 11.

The plastic used for the container lining and/or the valve block 11 can advantageously also be polytrifluorochloroethylene.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A container for aggressive liquids such as silicon tetrachloride which corrodes stainless steel, the container comprising:

a wall forming the container, the wall having an inner surface extending from an opening, the wall being made of a material which is degradable by the fluid;

a flange surrounding the opening;

a lid also made of a material subject to degradation by the fluid;

means for securing the lid in sealed engagement with the flange;

at least one opening through the lid for passage of the fluid;

a valve block made of a material not subject to degradation by the fluid, the valve block having a bore therethrough in alignment with the hole and the lid; a rigid jacket surrounding the valve block and means for securing the rigid jacket to the lid with the valve block urged into abutment with the lid;

valve mains seated in the bore through the valve block and mechanically retained by the jacket, and a liner of a material not degradable by the fluid lining the inner surface of the wall of the container and the bottom surface of the lid whereby the aggressive fluid is mechanically retained by the strength of the wall and the lid while the wall, lid and valve are protected from corrosion by the fluid.

2. The container of claim 1 wherein the wall, lid and jacket are made of stainless steel and wherein the valve block and liner are made of a fluorinated hydrocarbon which is resistant to the aggressive action of liquids such as silicon tetrachloride.

3. The container of claim 1 wherein the lid is secured to the flange by a plurality of spaced bolts with a seal disposed between the lid and the flange.

4. The container of claim 1 wherein the jacket has an upper end and a lower end with the flange projecting from the lower end; and plurality of bolts passing through the jacket flange and threaded in the lid so as to secure the jacket in the lid.

5. The container of claim 4 wherein the means for securing valve members in the valve block is disposed at the top end of the jacket remote from the opening.

6. The container of claim 5 wherein there are two openings through the lid and two bores through the valve block lined with the openings through the lid, each of which bores receives a separate valve member.

7. The container of claim 6 further including a third valve member disposed at a right angle to the two valve members, and purging channels connected to the third bore receiving the third valve member.

8. The container of claim 1 wherein the liner, valve block and valve faces are made of polyvinylidene fluoride while the container wall, lid and jacket are made of stainless steel so as to safely contain a highly aggressive liquid such as silicon tetrachloride.

* * * * *